(No Model.)　　　　　　　　　　　　　　　　　　　　　2 Sheets—Sheet 1.

A. P. STORRS.
ICE CREAM FREEZER.

No. 488,325.　　　　　　　　　　　　Patented Dec. 20, 1892.

Witnesses
J. M. Fowler Jr
Aly Stewart

Inventor
Aaron P. Storrs,
By Church & Church
his Attorneys.

(No Model.) 2 Sheets—Sheet 2.

A. P. STORRS.
ICE CREAM FREEZER.

No. 488,325. Patented Dec. 20, 1892.

Witnesses
J. M. Fowler Jr.
Alex. J. Stewart

Inventor
Aaron P. Storrs,
by Church & Church
his Attorneys

UNITED STATES PATENT OFFICE.

AARON P. STORRS, OF OWEGO, NEW YORK.

ICE-CREAM FREEZER.

SPECIFICATION forming part of Letters Patent No. 488,325, dated December 20, 1892.

Application filed June 28, 1892. Serial No. 438,322. (No model.)

*To all whom it may concern:*

Be it known that I, AARON P. STORRS, of Owego, in the county of Tioga and State of New York, have invented certain new and useful Improvements in Ice-Cream Freezers; and I do hereby declare the following to be a full, clear, and exact description of the same, reference being had to the accompanying drawings, forming a part of this specification, and to the letters of reference marked thereon.

This invention relates to improvements in ice cream freezers, and has for its object to provide a simple and economical freezer, adapted to freeze the cream smoothly and rapidly, and when frozen, to maintain the same in such condition for a long period by the use of a minimum quantity of ice.

The invention consists in certain novel details of construction and combinations and arrangements of parts all as will be now described and pointed out particularly in the appended claims.

Figure 1:
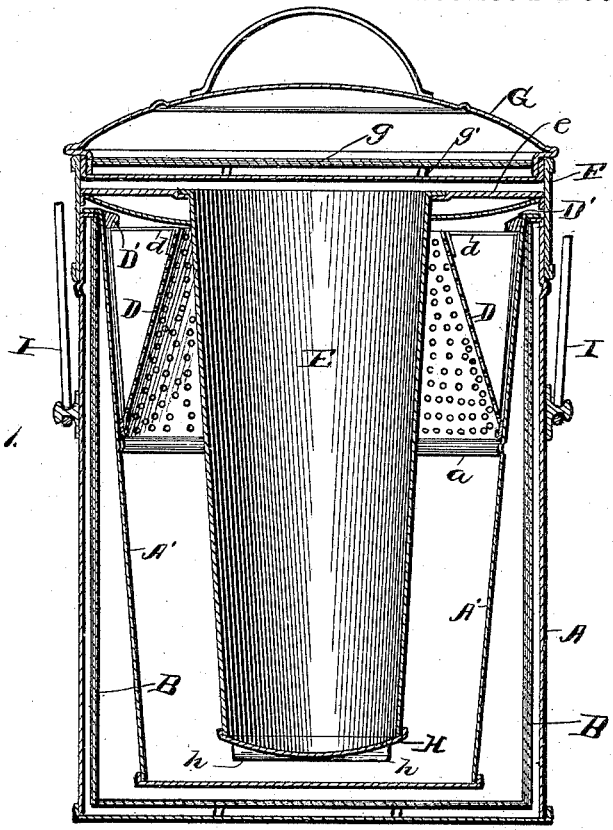
Figure 2:
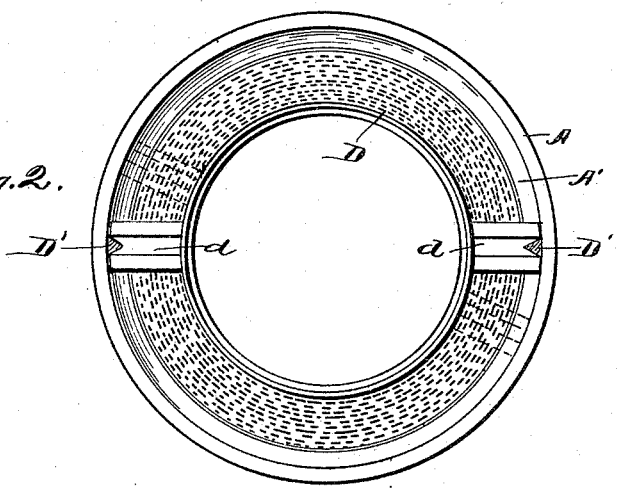
Figure 3:
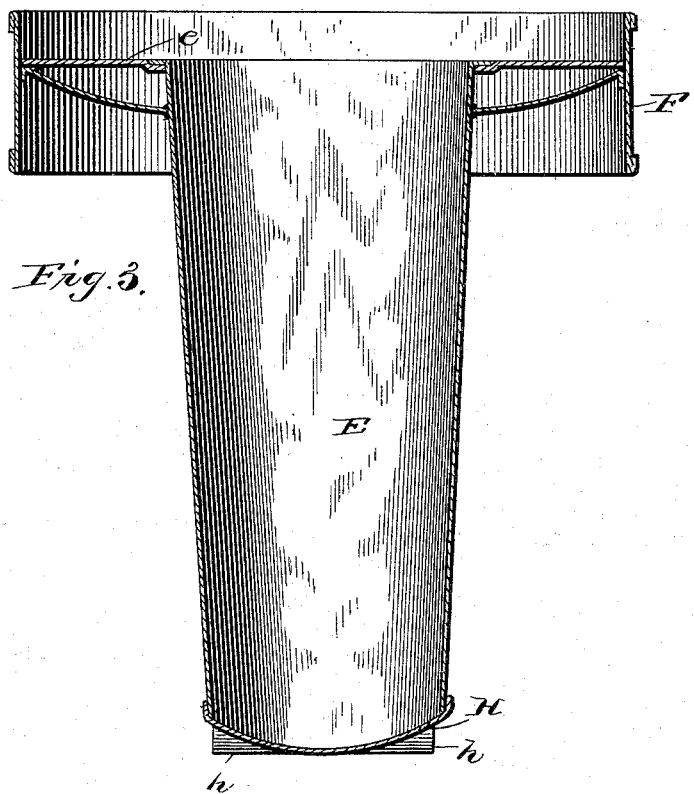
Figure 4:
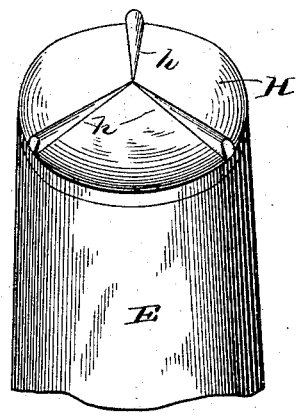

Referring to the accompanying drawings: Figure 1 is a vertical section through a freezer embodying my present improvements. Fig. 2 is a top plan view of the outer receptacle showing the means for retaining the perforated frusto-conical partition. Fig. 3 is an enlarged section of the top and bottom of the cream receptacle, and Fig. 4 is a detail perspective of the bottom of the same.

Similar letters of reference in the same figures indicate the same parts.

The outer receptacle or vessel is preferably constructed of sheet metal, such as tin, with double walls A, A'; a convenient construction being to insert a somewhat smaller vessel within a larger vessel and by uniting their upper edges form a rigid structure. The air space between the inner and outer walls is divided by a non-conducting partition B which may be of any substance, such as paper, felt, asbestus or other fabric, the object being to form a double air space separated by the non-conducting partition, which construction has been found highly efficient for the present purposes. The inner wall A' is provided with a supporting bead or projection *a*, preferably at a point about midway of its height, and upon this bead, a frusto-conical perforated partition D is adapted to rest, forming with the upper portion of the inner wall A', a chamber for the reception of salt as will be presently explained.

The perforated frusto-conical partition is provided with arms *d*, which, when the partition is properly located within the vessel, are turned in beneath lugs or projections D' on the vessel and serve to retain the partition firmly in place. The cream receptacle E passes down through the perforated partition, and at the upper edge is secured to or formed integral with a flange or disk *e*, surrounded by and united to a ring F which projects above, as well as below, the flange, as shown clearly in Figs. 1 and 3. To strengthen this structure, a second and concave disk is united to the body of the receptacle E at a point somewhat below the upper edge, and extends upwardly and outwardly to the ring F, to which, or the edges of the disk *e* it is united by solder or otherwise. The bottom or lower edge of the ring F is adapted to fit over and embrace the upper edge of the outer receptacle after the manner of a cover, which it, in effect, forms for the said outer receptacle, and the upper edge of said ring is adapted for the reception of the true cover G, which is preferably formed with double walls, and with the air space between such walls divided by a non-conducting partition *g* similar to the partition *a* before described, suitable means such as projections *g'* being employed to position and retain the partition away from the bottom wall.

The bottom of the cream or inner receptacle is formed convex or inclined upward from a central point as shown at H, and further is provided with a series of projections or wings *h* to facilitate its entry or passage through the ice as it is being inserted in the outer receptacle. The construction of this inner or cream receptacle is such, that when it is inserted within the outer receptacle it may be readily forced down through the broken ice contained therein by giving it a slight rotary movement, causing the pieces of ice to be loosened by the projections or wings and forced to one side by the inclined or convex bottom. If desired, the receptacle itself may be tapered from top to bottom to further facilitate its entry and cause the ice to lie close to the same during the freezing operation.

In use, broken ice is placed within the outer receptacle and the chamber formed by the perforated frusto conical partition, is filled with salt, then a quantity of strong brine is poured over the ice, and the cream receptacle containing the materials to be frozen is inserted and forced down with a slight rotary movement, until the ring or its upper edge seats on the edge of the outer receptacle. The cover may now be put upon the cream receptacle, or it may have been previously placed thereon, and the whole is left standing for a suitable time, when the cover is removed and the cream or materials to be frozen are agitated, preferably by means of a wooden blade in the hands of the operator. This agitation should be repeated as often as found necessary with the particular materials being frozen, due regard being had for the product desired. When frozen, it will be found that with little or no additional ice the cream or frozen material may be perfectly kept for a long period.

The device is economical, in that only a small quantity of ice is necessary, and the salt not actually taken into the solution is preserved in the salt chamber, besides all of which, a material advantage is derived from the employment of the ring and disks forming the cover for the outer receptacle, inasmuch as when the cream receptacle is being put in position, there is absolutely no danger of the brine running over into the same, nor is there any danger of the brine finding its way into the cream when splashed about, should it become desirable or necessary to transport or convey the freezer from place to place.

To facilitate transportation of the freezer it is provided with a handle I of any suitable description.

Having thus described my invention what I claim as new is:—

1. In an ice cream freezer, the combination with the outer receptacle, of the inner receptacle having the disk at the top thereof, the ring united to the outer edge of said disk and projecting above and below the same, the lower edge of the ring seating on the outer receptacle to form a cover thereof and the cover proper seating on the upper edge of the ring; substantially as described.

2. In an ice cream freezer, the combination with the outer receptacle, of the inner or cream receptacle having the disk secured thereto at the upper edge, the ring surrounding and secured to said disk, the second disk secured to the receptacle below the first mentioned disk and united to the ring at the outer edge; whereby a rigid structure is formed, and the cover for said receptacle; substantially as described.

3. In an ice cream freezer, the combination with the outer receptacle having the supporting bead or projection and retaining lugs or projections, of the inner or cream receptacle, the perforated frusto conical partition seating on the supporting bead or projection and having the arms co-operating with the retaining lugs or projections on the outer receptacle; whereby the partition is held in place; substantially as described.

4. In an ice cream freezer, the combination with the outer receptacle, of the inner receptacle having the convex bottom with the series of wings or projections thereon whereby the entry of the vessel through the broken ice in the outer vessel is facilitated; substantially as described.

AARON P. STORRS.

Witnesses:
G. S. CHATFIELD,
G. T. HANSELL.